United States Patent [19]

Samal et al.

[11] Patent Number: 4,879,091
[45] Date of Patent: Nov. 7, 1989

[54] EQUIAXED DISPERSION STRENGTHENED COPPER PRODUCT AND PROCESS FOR MAKING SAME

[75] Inventors: Prasan K. Samal, Lyndhurst; Anil V. Nadkarni, Mentor, both of Ohio

[73] Assignee: SCM Metal Products, Inc., Cleveland, Ohio

[21] Appl. No.: 132,799

[22] Filed: Dec. 14, 1987

[51] Int. Cl.[4] .............................................. C22C 9/00
[52] U.S. Cl. ...................................... 419/19; 419/28; 419/38; 419/44; 419/49; 419/55; 419/57
[58] Field of Search ....................... 419/19, 28, 38, 44, 419/48, 49, 55, 57

[56] References Cited

U.S. PATENT DOCUMENTS

| | | |
|---|---|---|
| 4,045,644 | 8/1977 | Shafer et al. .......................... 148/432 |
| 4,315,770 | 2/1982 | Nadkarni ........................ 75/0.5 BC |
| 4,315,777 | 2/1982 | Nadkarni et al. . |
| 4,440,572 | 4/1984 | Nadkarni et al. . |
| 4,462,845 | 7/1984 | Klar et al. ............................ 75/0.5 B |
| 4,478,787 | 10/1984 | Nadkarni et al. . |
| 4,599,214 | 7/1986 | Luton . |
| 4,604,259 | 8/1986 | Whitman . |
| 4,752,334 | 6/1988 | Nadkarni et al. . |

Primary Examiner—Stephen J. Lechert, Jr.
Assistant Examiner—Eric Jorgensen
Attorney, Agent, or Firm—Lieberman, Rudolph & Nowak

[57] ABSTRACT

This invention relates to substantially full-dense, near-net shape bodies made of dispersion strengthened copper (D.S.C.) powder and products which are cold formed and/or machined from these bodies, such as resistance welding electrodes. The invention includes processes for manufacturing substantially full-dense, near-net shape, substantially equiaxed bodies from D.S.C. powder.

9 Claims, 1 Drawing Sheet

EQUIAXED DISPERSION STRENGTHENED COPPER PRODUCT AND PROCESS FOR MAKING SAME

FIELD OF THE INVENTION

Dispersion strengthened copper powder ("D.S.C.") essentially consists of a pure copper matrix and an extremely fine (submicroscopic) dispersion of aluminum oxide particulates. D.S.C. powder can be used to manufacture products which possess unique combinations of high mechanical strength and electrical conductivity, and which retain most of their mechanical strength after exposure to high temperatures. D.S.C. powder differs greatly from conventional copper and copper base alloy powders in regards to sinterability and response to annealing. D.S.C powders are difficult to sinter and no densification (or shrinkage) occurs during sintering. The grain structure (including grain size) from D.S.C. does not change during annealing.

It is desireable to maximize the density in forming bodies from the D.S.C. powder, to achieve optimum strength. It is also desirable to form the body close to the final ("net") contours of the product, to avoid wasted efforts and material. "Substantially full-dense" is used to mean having a high density which approaches the theoretical full density of 100%. "Near-net shape" means that the shape of a body (e.g. a blank from which a resistance welding electrode is made) which is close to the desired dimensions of the product to be made from the body (e.g. the finished resistance welding electrode).

This invention relates to substantially full-dense, near-net shape bodies (or "blanks") having a substantially equiaxed grain structure, made of D.S.C. powder. These blanks can be cold formed and/or machined into substantially full dense products such as resistance welding electrodes. The invention includes processes for manufacturing substantially full-dense, near-net shape D.S.C. bodies and substantially full-dense products from those bodies.

DESCRIPTION OF THE PRIOR ART

Substantially full-dense products are manufactured using powder metallurgy ("P/M") techniques such as hot forging (e.g. for the automotive industry) and hot isostatic pressing (e.g. for tool steel products). These substantially full-dense bodies have close-to-final dimensions, and this near-net shape technology offers significant cost savings due to minimization of scrap loss and reduction in the labor cost of machining. For example, substantially full-dense metal powder products having sharp ridges, threads or deep grooves cannot be practically made by P/M hot forging, hot isostatic pressing or cold isostatic pressing techniques, therefore, the making of a near-net shape is a practical alternative in these situations.

One of the major commercial uses of D.S.C. is in the manufacture of resistance welding electrodes. These electrodes are used for spot welding of steel sheets in automotive and appliance industries. D.S.C. is preferred over other copper alloys due to its ability to resist softening during use at high temperatures and due to its ability to resist sticking to galvanized steel. Currently, D.S.C. welding electrodes are made from rod stock, using two technologies for making rod stock from D.S.C. powder. One of these two techniques is hot extrusion of D.S.C. powder canned in a copper (or steel) container. The finished rod stock is substantially full dense. The other technique is that of swaging a copper or steel tube filled with D.S.C. powder. The rods made by either processes are first cut into blanks or cylindrical pieces and then cold formed into electrodes.

U.S. Pat. No. 4,110,130 to Nadkarni describes a method for hot forging substantially full-dense welding electrodes and welding wheels from dispersion strengthened powdered metal (including D.S.C.) and is incorporated herein by reference.

Cold forming of products, as used in the rod-based technologies and in the instant invention, is preferred over the hot forming procedures inherent to the hot forging process as described in the '130 patent. One disadvantage is that hot forging requires that the tools be heated, resulting in shorter tool life. In addition, hot forging requires that the workpiece be handled in a protective atmosphere to avoid oxidation while the workpiece is transferred from the furnace to the forge tooling.

One of the major disadvantages of the rod-based process is that the grain structure of the D.S.C. bodies formed by this process is elongated, often substantially so ("fibrous"), in contrast to the substantially equiaxed grain structure of the instant invention. This fibrous grain structure is undesirable since it leads to cracking (splintering) of electrode tips under the welding pressure. In order to overcome this problem, blanks cut from rod stock are often cold formed to a cylinder having larger diameter ("upset") to alter the grain structure.

Another disadvantage of the rod-based process is that D.S.C. rods have a copper or steel outer layer (cladding), resulting from the bonding of the metal container to the consolidate core. Presence of this copper or steel cladding on the welding surface of the finished electrode is highly objectionable since it tends to stick to the material being welded. Because of this problem, blanks processed from D.S.C. rods need to be machined to remove at least some of the cladding. This results in scrap loss and additional processing cost.

Another disadvantage is that the cutting of rods into blanks entails a certain amount of cutting loss. For example, in the cutting of ⅝" long blanks, a ⅛" cut results in material loss amounting to 20%. Shearing of rods into blanks creates other problems such as cracking of the material due to excessive cold work and undesirable deformation of the ends of blanks. The latter leads to problems with feeding of the blanks into the die cavity for cold forming.

It is therefore one object of the instant invention to provide a substantially full-dense, near-net shape body having an equiaxed grain structure, made from D.S.C. powder.

It is a further object of the instant invention to provide a substantially full-dense product, such as a resistance welding electrode, made from the body of the instant invention, using cold forming techniques.

It is a still further object of the invention to provide methods for making substantially full-dense, near net shape bodies and products therefrom which minimize scrap loss and processing costs.

SUMMARY OF THE INVENTION

The instant invention relates to substantially full-dense, near-net shape bodies having equiaxed grain structures, made from D.S.C. powder, and products, made from these bodies, and processes for making them. The products are cold formed or machined (or both) from the bodies.

It is a feature of the invention that the grain structure of the substantially full-dense, near-net shape D.S.C. body is substantially equiaxed.

It is a still further feature of the invention that the substantially full-dense product is cold formed and/or machined from the body.

It is another feature that the inventive processes result in minimized scrap loss and reduced labor costs.

These and other objects and features of the invention will be more fully appreciated from the following detailed description.

DETAILED DESCRIPTION

Figure 1:
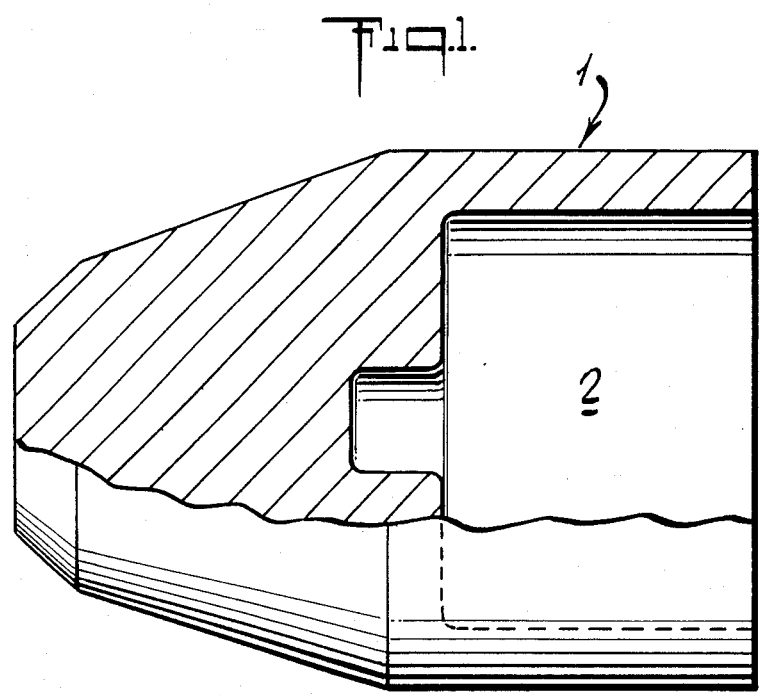
FIG. 1 is a sectional view of a resistance welding electrode.

Resistance welding electrodes made from D.S.C. near-net shape bodies (also known as "blanks") have shown significantly superior performance over electrodes made from rod based blanks. The instant invention provides a near-net shape, substantially full-dense body (for example, a resistance welding electrode blank) made from D.S.C. powder, which has a substantially equiaxed grain structure. This blank represents a significant improvement over the elongated and fibrous grain structure which is inherent to a rod-based blank. This fibrous grain structure makes the electrode tip more susceptible to cracking and splintering during welding. The grain structure of the instant invention is coarser and almost totally equiaxed, whereas the grain structure of even a converted (e.g. upset) rod-based blank is much finer and is a mixture of equiaxed, elongated and fibrous grains. A coarser equiaxed grain structure is preferred in a resistance welding electrode because of the reduced Zinc dispersion into the electrode tip. Zinc dispersion contributes to rapid wear of the tip.

Blanks made by the instant invention can be cold formed and/or machined into products such as resistance welding electrodes, without the tool wear and special handling required by the hot forging method described in U.S. Pat. No. 4,110,130.

D.S.C. powder can have a composition ranging from between about 0.25% weight $Al_2O_3$+balance copper and 1.5% weight $Al_2O_3$+balance copper.

In general, the invention involves for example, making a blank via a first pressing of the powder, then sintering; then a final re-pressing ("coining") and re-sintering, or HIPing, or hot pressing, possibly with intermediate sintering or pressing steps. The first pressing does not seak maximum density, but rather is in the range of 85-97% of theoretical full density, preferably 88-95%, with 91-92% presently giving best results. It is the final press or HIP or hot press which seeks maximum (substantially full) density in the range of 95% and above, preferably at least 97%, with 97.5% plus, presently working best.

Additional steps of sintering and/or re-pressing (coining) can be added between the pressing and HIPing steps of the embodiments.

A first embodiment of the inventive process includes the following steps:
(a) pressing D.S.C. powder into a green compact;
(b) sintering the compact; and
(c) repressing the sintered compact into a body (such as the blank from which a resistance welding electrode can be made).

The body can then be cold formed or machined into a product, for example, a resistance welding electrode. Example 1 below describes an example of this embodiment.

EXAMPLE 1

D.S.C. Powder, containing about 0.47% wt. $Al_2O_3$ and balance copper was pressed into right cylindrical compacts measuring about 0.75" in diameter $\times$ 0.75" in height and having a density of about 90.7% of theoretical full density. The compacts were then sintered at about 1850 degrees F. for about one hour and then repressed to a density of about 97.6% of full theoretical density. These compacts were then HIPed into blanks using a HIP vessel without container. HIPing was done at about 1750 degrees F. for about four hours at a pressure of about 15000 psi. After hot isostatic pressing, the blanks were formed into resistance welding electrodes by cold forming. The electrodes were weld tested to determine their weld life. The test parameters are shown in Table 1 and the test results are shown on line 2 of Table 2.

A second embodiment of the inventive process includes the following steps:
(a) pressing D.S.C. powder into a green compact; and
(b) HIPing the compact into a body (such as the blank from which a resistance welding electrode is made).

The body can then be cold formed or machined into a product, for example a resistance welding electrode. Example 2 below describes specific examples of this embodiment.

EXAMPLE 2

D.S.C powder containing about 0.47% $Al_2O_3$ and balance copper was pressed into cylindrical compacts having a diameter of about 4", height of about 1" and green density of about 93.0% of theoretical full density. A number of these discs were placed in a welded steel cylindrical can, with refractory cloth separating the discs from each other and from the can interior walls. The air in the can was then evacuated and the can was vacuum sealed. After this, the can was placed in a HIP vessel and HIPed at about 1750 degrees F. under a pressure of about 15000 psi for about four hours. After HIPing, the can was cut open and the discs were checked for density, dimensional accuracy and mechanical properties. The density was about 99.0 to 99.5% of theoretical full density. Dimensional accuracy was excellent. The tensile test data were comparable to those of material made by hot extrusion process (e.g. Ultimate Tensile Strength (U.T.S) of 65 KSI, Yield Strength (Y.S.) of 52KSI and an elongation 15%. In order to determine the performance of the material in seam welding application, two spot welding electrodes were machined from one disc and tested by spot welding galvanized steel per test parameters shown on Table 1. The performance of the pair of electrodes was superior to those made by the hot-extrusion process as shown on line 3 in Table 2. Although the discs were not evaluated in actual seam welding apparatus, it is believed that its performance based on spot welding is a strong indication that it will perform well in the seam welding of steel.

A third embodiment of the inventive process includes the following steps:

(a) pressing D.S.C. powder into a green compact;
(b) sintering the compact in an inert or reducing atmosphere;
(c) re-pressing (coining) the sintered compact; and
(d) resintering the compact into a body (such as the blank from which a resistance welding electrode is made), possibly in a different atmosphere.

The body can be cold formed or machined into a product, for example a resistance welding electrode. Examples 3(A) through 5 below, describe specific examples of this embodiment.

EXAMPLE 3(A)

D.S.C. powder containing about 0.47% by weight $Al_2O_3$ and balance copper was pressed into cylindrical compacts having a diameter of about 0.620", height of about 0.56" and green density of about 91.5% of theoretical full density. The compacts were then sintered in hydrogen atmosphere at a temperature of about 1860 degrees F. for about one hour. Following this, the compacts were re-pressed (coined) to achieve a density of about 97.5% to 98.0% of theoretical full density. These were then re-sintered into blanks in a nitrogen atmosphere at about 1860 degrees F. for about one hour. The sintered blanks which had equiaxed grain structure were cold formed into welding electrodes without any machining. The cold formed electrodes were then successfully tested in actual weld testing of galvanized steel sheet. The parameters used for weld testing are shown in Table 1. The test results are shown in Table 2 on line 4.

EXAMPLE 3(B)

The material and process use for making the electrode blanks were identical to those shown in Example 3(A), except that the green density of the compacts was about 95% of theoretical full density instead of 91.5%. The electrode forming and weld testing parameters were the same as in Example 3(A). The test results are shown on line 5 in Table 2.

EXAMPLE 4(A)

The material and process used for making the electrode blanks were identical to those in Example 3(A), except for the sintering atmosphere used for the first sintering. In this case, nitrogen gas was used as the sintering atmosphere (instead of hydrogen) in the first sintering step, as well as for the second sintering step. The electrode forming and weld testing parameters were identical to those in Example 3(A). The test results are shown on line 6 in Table 2.

EXAMPLE 4(B)

The material and process for making the electrode blanks were identical to those in Example 3(B), except for the sintering atmosphere used for the first sintering. In this case, nitrogen gas was used as the sintering atmosphere (instead of hydrogen) in the first sintering step. The electrode forming and weld testing parameters were the same as those in Example 3(B). The test results are shown on line 7 in Table 2.

EXAMPLE 5

The material and process used for making the electrode blanks were identical to those in Example 3(A), except for the sintering atmosphere used for the first sintering. In this case dissociated ammonia was used as the sintering atmosphere instead of hydrogen. The electrode forming and weld test parameters were the same as those in Example 3(A) for 3 pairs of test electrodes, and fourth pair was formed into a cylindrical nose design i.e. cold forming the waterhole (2 as shown in FIG. 1) only, the shape of the nose end of the electrode remaining as a right cylinder, as in the blank stage. The cylindrical nose shape was then machined into a conical shape 1 as shown in FIG. 1. The purpose of this test was to determine the properties of electrodes made by machining the electrode tip. The weld test parameters were the same as in Table 1. The test results of the three pairs of all cold formed electrodes are shown in Table 2 in lines 8, 9 and 10 respectively and that of the pair of electrodes made partial machining on line 11.

A fourth embodiment of the inventive process includes the following steps:
(a) pressing D.S.C. powder into a green compact; and
(b) hot pressing the compact into a body (such as the blank from which a resistance welding electrode is made).

The body can be cold formed or machined into a product, for example a resistance welding electrode.

The comparisons shown in Table 2 are based on the life of electrodes (number of welds) in the welding of electrogalvanized steel described in detail in the examples described above.

The density of the first pressing may be lowered until the green strength becomes too low, or raised until lamination problems appear. The density after the second press/sinter, or HIP, or hot pressing is preferably maximized, with the lower limit defined by acceptable, economical results. Sintering temperature is confined by a loss of dispersion at excessive temperatures, and loss of strength at the low end. Sintering time can generally be lengthened without ill-effect; the shortest time we have had good results is about 20 minutes. The sintering atmosphere can be neutral or reducing; choices being made more on economy and safety (e.g. nitrogen).

Certain parameters are important to making a body which can be formed into the final product; which body (and product) have a density substantially approaching theoretical full density and is both strong and ductile. These properties in the blank are important so that it will be suitable for example, for further forming into a welding electrode.

It is important that the density of the pressed green compact not be so high as to form laminations thereby weakening the final product. It is similarly important to maintain a density of at least about 85% in order to avoid too low a green strength. Thus the density of the compact after the first pressing should be about 91% to 92%. A range of about 88% to 95% is acceptable and a range of 85% to 97% defines the outer limits of acceptability.

The density of the compact after coining (re-pressing) or HIPing or hot pressing should be as close to 100% as possible without the formation of laminations in the product. The preferred density is about 98% to 100%. A good lower limit of this range would be about 97.5% and the lowest acceptable lower limit would be about 95%.

The time period, temperature and atmosphere used in the sintering process can also be important to the final process. The length of time of the sintering process should be about 20 minutes or more.

The temperature range for the sintering process is from about 1750 degrees F. to about 1860 degrees F.

Around 1900 degrees F. would be the maximum upper limit.

The atmosphere for the sintering process should be inert or reducing, e.g. argon, nitrogen, hydrogen, dissociated ammonia. As shown in Examples 4(B) and 5, the atmospheres used in the first and second sintering steps can be different.

The electrodes made in the foregoing examples had an equiaxed grain structure and in most cases had a longer weld life than electrodes made by the conventional extruded or swaged, rod-based techniques.

The foregoing disclosure and description of the invention is illustrative and explanatory thereof and various changes in the size, shape and materials as well as the various parameter ranges expressed, may be made within the scope of the appended claims without departing from the spirit of the invention.

TABLE 1: WELD TEST PARAMETERS

Steel—Electrogalvanized 0.032" thick
Squeeze Time—25 cycles
Weld Time—10 cycles (dual pulse)
Hold Time—2 cycles
Welding rate—50 spots/minute
Electrode force—500 pounds
Cooling Water—2 liters/minute
Minimum nugget size—0.200"
Peeling frequency—200 or 250 welds

TABLE 2

WELDING TESTS OF D.S.C. ELECTRODES

| Line # | Ref. | Process | Sintering Atmosphere for first Sintering | Maximum Number of Welds to 18K. Amps | Wt. % Al$_2$O$_3$ | Grain Structure |
|---|---|---|---|---|---|---|
| 2 | Ex. 1 | Press-Sinter-HIP | N$_2$ | 7,900 | .47% | Equiaxed |
| 3 | Ex. 2 | Press-HIP | — | 8,800 | .47% | Equiaxed |
| 4 | Ex. 3(A) | Press-Sinter-Repress-Resinter | H$_2$ | 8,600 | .47% | Equiaxed |
| 5 | Ex. 3(B) | Press-Sinter-Repress-Resinter | H$_2$ | 6,800 | .47% | Equiaxed |
| 6 | Ex. 4(A) | Press-Sinter-Repress-Resinter | N$_2$ | 9,400 | .47% | Equiaxed |
| 7 | Ex. 4(B) | Press-Sinter-Repress-Resinter | N$_2$ | 9,000 | .47% | Equiaxed |
| 8 | Ex. 5 | Press-Sinter-Repress-Resinter | D.A. | 10,400 | .47% | Equiaxed |
| 9 | Ex. 5 | Press-Sinter-Repress-Resinter | D.A. | 11,400 | .47% | Equiaxed |
| 10 | Ex. 5 | Press-Sinter-Repress-Resinter | D.A. | 9,600 | .47% | Equiaxed |
| 11 | Ex. 6 | Press-Sinter-Repress-Resinter-Machine | D.A. | 9,200 | .47% | Equiaxed |
| 12 | — | Conventional-Swaged | — | 8,000 | .47% | Elongated |
| 13 | — | Conventional-Extruded | — | 6,800, 7,400, 7,600 | 1.1% | Fibrous-Converted |

What is claimed is:

1. A method for making a substantially fully-dense, near net-shape body made of dispersion strengthened copper powder and having a substantially equiaxed grain structure, comprising the steps of:
    (a) pressing dispersion strengthened copper powder into a green compact; and
    (b) hot isostatically pressing the compact into said body.

2. The method of claim 1 comprising the additional step of sintering said compact prior to hot isostatically pressing it.

3. The method of claim 2 comprising the additional step of re-pressing said compact after sintering it.

4. A method for making a substantially fully-dense, near net-shape body made of dispersion strengthened copper powder and having a substantially equiaxed grain structure, comprising the steps of:
    (a) pressing dispersion strengthened copper powder into a green compact;
    (b) sintering the compact in a first atmosphere;
    (c) re-pressing the sintered compact into said body; and
    (d) resintering said body in a second atmosphere.

5. The method of claim 4 wherein the density of the compact before re-pressing is not more than about 97% of full theoretical density.

6. The method of claim 4 wherein the first and second atmospheres are the same.

7. The method of claim 4 wherein the first and second atmospheres are inert.

8. The method of claim 4 wherein the first and second atmospheres are reducing.

9. A method for making a substantially fully-dense, near net-shape body made of dispersion strengthened copper powder and having a substantially equiaxed grain structure, comprising:
    (a) pressing dispersion strengthened copper powder into a green compact; and
    (b) hot pressing the compact into said body.

* * * * *